July 30, 1968 A. L. THOMPSON 3,394,808
APPARATUS FOR SEPARATING GRANULAR MATERIALS
Filed Jan. 3, 1966 2 Sheets-Sheet 1
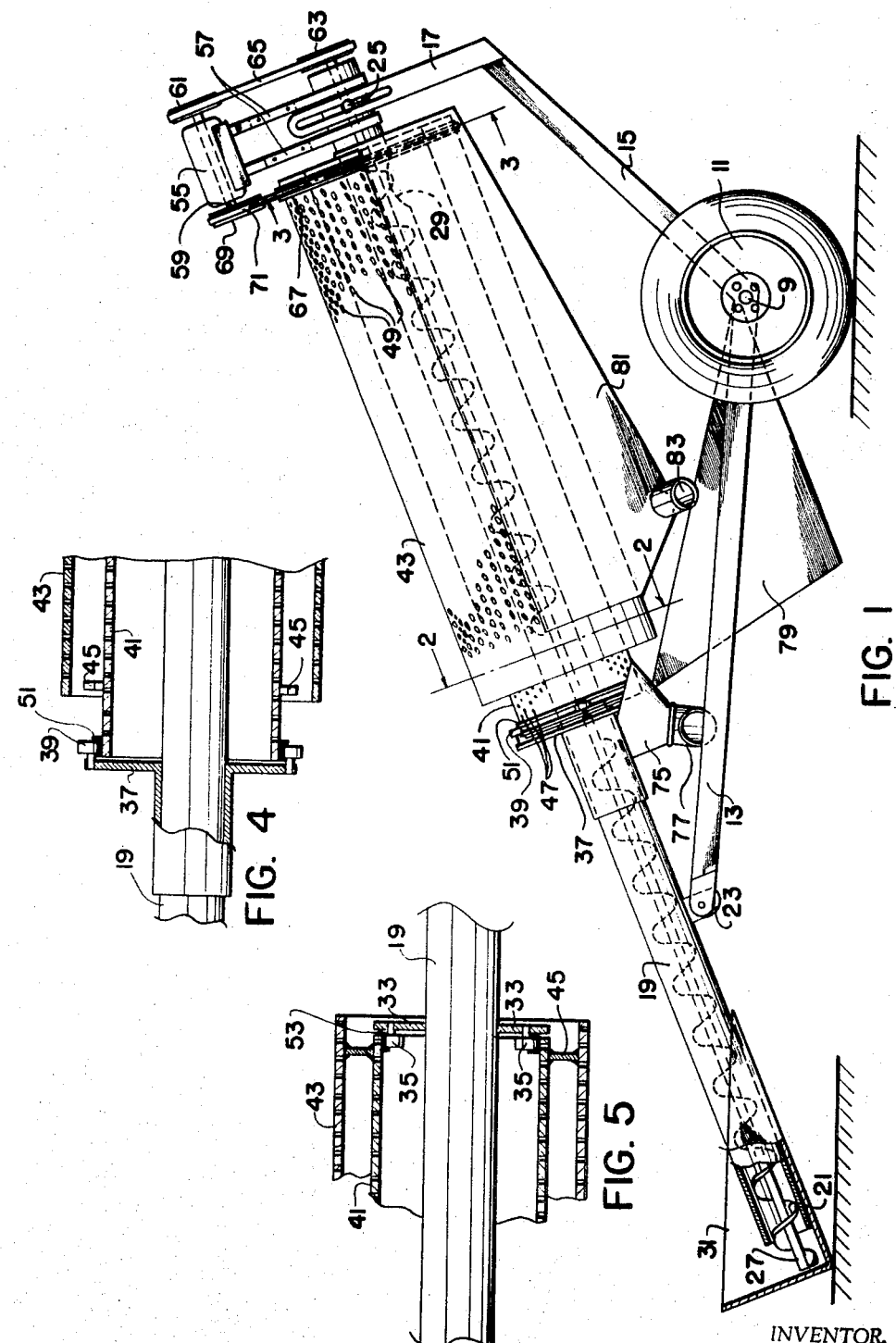
INVENTOR.
ANDY L. THOMPSON
BY
ATTORNEY July 30, 1968  A. L. THOMPSON  3,394,808
APPARATUS FOR SEPARATING GRANULAR MATERIALS
Filed Jan. 3, 1966  2 Sheets-Sheet 2

INVENTOR.
ANDY L. THOMPSON
BY John H. Widdowson
ATTORNEY

United States Patent Office 3,394,808
Patented July 30, 1968

3,394,808
APPARATUS FOR SEPARATING
GRANULAR MATERIALS
Andy L. Thompson, R.R. 2, Courtland, Kans. 66939
Filed Jan. 3, 1966, Ser. No. 518,068
4 Claims. (Cl. 209—245)

ABSTRACT OF THE DISCLOSURE

An apparatus for separating granular materials having an elongated auger conveyor means secured to a frame means; inner and outer perforated cylinder members mounted about the auger conveyor for rotation relative thereto; power means mounted on the frame means connected to the auger conveyor and the inner and outer cylinder members; a trash hopper member operably connected to the inner cylinder member to receive waste products therein; a product hopper member secured to the frame means operable to receive the separated granular material from the outer cylinder members; and a fine material hopper connected to the frame means extended below and along the length of the outer cylinder member adapted to receive fine material such as dust particles therein.

Many devices are known in the prior art for separating granular materials, especially apparatus for separating grain from waste such as husks, chaff, cobs, and the like. Some of the devices known to the prior art are not constructed to effectively separate both coarse and fine materials from the granular end product desired. These devices will separate either coarse materials or fine materials by allowing the unseparated waste material to remain with the end product. Some of the devices known to the prior art are designed for stationary use and cannot be easily transported for use in other locations except the one in which it is installed. Other of the devices known to the art are quite complex and difficult to manufacture and consequently expensive.

I have invented a new apparatus for separating granular materials which has a frame. There is an inclined conveyor mounted on the frame. A rotatable separator is mounted on the frame around the upper portion of the conveyor. A source of power is provided, and it is operably connected to the conveyor and the separator. A collector for material processed is preferably mounted on the frame. The new apparatus of my invention is constructed and adapted to elevate material to be separated by the conveyor, and separate the material in the separator. The collector which is preferably provided receives the material from the separator.

The new apparatus of my invention for separating granular materials overcomes the disadvantages inherent in the prior art. My new apparatus can be used for separating many types of granular materials such as grading sand, gravel, grain, or the like. It is particularly useful in separating by-products from grain such as husks, chaff, dirt, stems and rocks, and the like. The three way separation of my preferred apparatus very effectively isolates grain from the by-products of harvesting such grain. My new apparatus is easily portable and self-contained so that it requires no additional apparatus and setting up time when used in different locations. The simplicity of design and manufacture of my apparatus makes it quite economical to manufacture and maintain.

It is an object of this invention to provide a new apparatus for separating granular materials.

Another object of this invention is to provide a new apparatus for separating granular materials which is easily portable.

Yet another object of this invention is to provide a new apparatus for separating granular materials which segregates coarse, medium and fine materials.

And one more object of this invention is to provide a new apparatus for separating granular materials particularly grain or corn or the like.

And yet one more object of this invention is to provide a new apparatus for separating granular materials which is easy and economical to manufacture and to maintain.

Various other objects, advantages, and features of the invention will become apparent to those skilled in the art from reading this disclosure.

Drawings accompany and are a part of this disclosure. These drawings depict preferred specific embodiments of the new apparatus for separating granular materials of my invention, and it is to be understood that these drawings are not to unduly limit the scope of the invention.

In the drawings,

FIG. 1 is a side elevation of the preferred specific embodiment of my invention.

FIG. 4 is a cross sectional view taken along line 4—4 of FIG. 2.

FIG. 5 is a cross sectional view taken along line 5—5 of FIG. 3.

Figure 6:
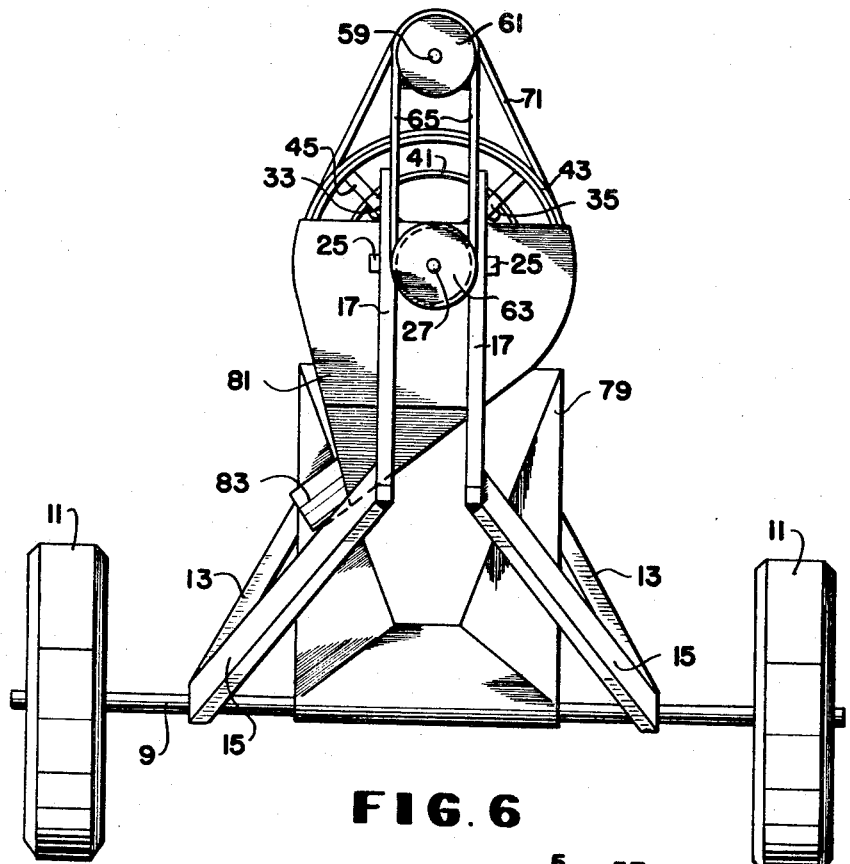
FIG. 6 is an end view of the upper portion of the apparatus of my invention.
Figure 2:
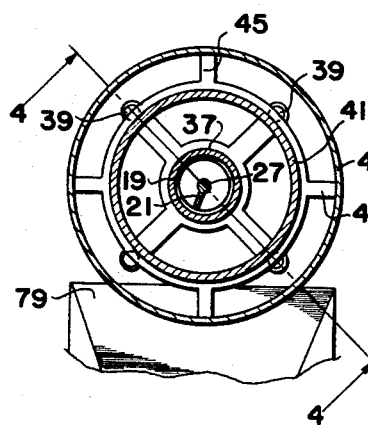
FIG. 2 is a cross sectional view taken along line 2—2 of FIG. 1.
Figure 3:
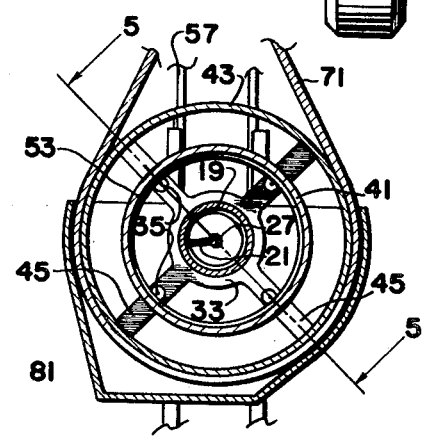
FIG. 3 is a cross sectional view taken along line 3—3 of FIG. 1.

In the following is a discussion and description of the invention made in reference to the drawings whereon the same reference numerals are used to indicate the same or similar parts and/or structure. The discussion and description is of preferred specific embodiments of the new apparatus for separating granular materials of my invention, and it is to be understood that the discussion and description is not to unduly limit the scope of the invention.

Referring now to the drawings in detail, the preferred specific embodiment of my invention has a frame that has a transverse axle 9 with a wheel 11 mounted on each end portion of the axle 9. These wheels 11 can be of any suitable type but preferably one mounted on the axle 9 by bearings (not shown) to rotate around the axle 9 and which are so constructed to have pneumatic tires mounted thereon. A pair of spaced inwardly projecting longitudinal members 13 are rigidly mounted on the axle 9. Two other longitudinal members 15 are mounted on the axle 9 and the first-named longitudinal members, these longitudinal members 15 project in a generally opposite direction from that of the members 13 and inwardly from the wheels 11. A slotted member 17 is mounted on the projecting end portion of each of the longitudinal members 15 and projects generally upwardly therefrom.

An inclined conveyor is provided in my invention. This conveyor can be of any suitable type such as a cup and endless belt, a cup and chain, or the like, but preferably a tube 19 which has a screw auger 21 rotatably mounted therein. The tube 19 has a downwardly projecting mounting flange 23 rigidly mounted on a bottom portion thereof. The outwardly projecting end portions of the frame members 13 are mounted on the mounting flange 23 preferably by bolt means. The upward end portion of the tube 19 projects between the slotted members 17. A threaded boss 25 is mounted on each side of the upward end portion of the tube 19 with one of the bosses 25 projecting through a slot in one of the slotted members 17, and the other of the bosses 25 projecting through the slot of the other of the slotted members 17. A nut is preferably mounted on the outwardly projecting end portion of each of said bosses 25 to secure the tube 19 in an adjustable manner to the slotted frame members 17. The auger 21 has a shaft portion 27. This shaft portion 27 projects through the tube 19 at its upper end. An aperture 29 is provided in the lower portion of the tube 19 in an upper portion thereof. The aperture 29 is provided to discharge materials to be separated which have been elevated by the auger 21 in the tube 19. A loading hopper 31 is operably mounted on the downward portion of the tube 19. This hopper 31 can be of any suitable size, but preferably one which is sufficiently large to provide unloading space for a truck or the like.

A spider 33 is rigidly mounted on an upper portion of the tube 19. The spider 33 can be mounted in any suitable manner such as set screw means, clamping means, welding, or the like but preferably by set screws (not shown). This spider 33 can have any suitable number of radial arms, but preferably four. Each of the arms has a roller 35 mounted on its end portion. A second spider is similarly mounted on a central portion of the tube 19. Similarly to the first spider 33, the spider 37 preferably has four arms with a roller 39 mounted on the end portion of each arm. The spider 37 is preferably mounted on the tube 19 by set screws (not shown).

The separating means of my invention can have any number of perforated cylinders depending on the type of material to be separated and the separated products desired. In a preferred specific embodiment which is particularly adapted to separate corn from waste products, its has been found that two cylinders produce excellent results in this application of the invention. A perforated inside cylinder 41 is mounted around an upper portion of the tube 19. An outside cylinder 43 is rigidly and concentrically mounted around the inside cylinder 41 by a plurality of mounting arms 45 rigidly connecting the two cylinders. The perforations of the cylinder can be of any suitable size and any suitable number, depending on the type of material to be separated. In the preferred specific embodiments which is particularly adapted to separate corn from waste, it has been found in practice that perforations 47 in the inside cylinder 41 of approximately 5/8 inch in diameter has produced excellent results. In the same use it has also been found that perforations in the outside cylinder 49 approximately 3/16 inch in diameter have produced excellent results. The lower end portion of the inside cylinder 41 preferably has a circumferential grooved race 51 rigidly mounted around the outside thereof. This race is adapted to operably engage the rollers 39 of the spider 37, allowing the cylinder 41 to rotate with the spider 37 and the rollers 39 maintaining the cylinder 41 in position while rotating. Another circumferential race 53 is rigidly mounted on an inside end portion of the upper portion of the cylinder 41. This race 53 is adapted to allow the rollers 35 to roll therein and maintain the position of the cylinders 41 and 43 relative the tube 19.

The powering means of my invention can be of any suitable type such as a gasoline engine, diesel engine, a pulley arrangement connected to a stationary engine, tractor, or the like, an electric motor or the like, but preferably in the preferred specific embodiment an electric motor. The motor 55 can be operably mounted by any suitable means, but preferably by adjustable mounting brackets 57 mounted between the projecting end portion of the tube 19 and the motor 55. These brackets 57 can be mounted on the tube in any suitable manner such as bolt means, welding, or the like but preferably by bolt and clamp means (not shown). Any type of driving arrangement can be used on my invention such as chains and sprockets, gearing, and the like, but preferably by V-belts and pulleys. The motor 55 is constructed, in the preferred specific embodiment, so that the shaft portion 59 thereof projects from each end thereof, with the shaft portion 59 being longitudinal relative to the cylinders and tube 19. A V-belt pulley 61 is rigidly mounted on the outwardly projecting end portion of the shaft 59. An auger V-belt pulley 63 is rigidly mounted on the outwardly projecting end portion of the auger shaft 27. An auger V-belt 65 operably connects pulley 61 and pulley 63. A V-belt race is circumferentially and rigidly mounted around the upper end portion to the outer cylinder 43. A cylinder drive pulley 69 is rigidly mounted on the inwardly projecting end portion of the motor shaft 59. A V-belt 71 is operably mounted between pulley 69 and race 67. The powering means is arranged to rotate the auger 21 to elevate materials upwardly therein, and to rotate the cylinders 41 and 43 around the auger.

The material collecting means can be of any suitable type and any suitable number, depending on the number of separating cylinders used, and the types of material to be collected. In the preferred specific embodiment a trash hopper 75 is preferably mounted on spider housing 37 or on frame member 13 adjacent to the bottom of the lower end portion of the inside cylinder 41, in any suitable manner. In the preferred specific embodiment this hopper is provided with a spout 77 to discharge waste materials therefrom either into a suitable container which can be provided or onto the ground. In the preferred specific embodiment, this hopper will receive the coarse materials separated from the material. A product hopper 79 is mounted on the axle 9 and the frame members 13 immediately below and adjacent to the bottom portion of the lower portion of the outside cylinder 43. This hopper 79 can be of any suitable size and shape and can be movably mounted on the axle 9. It can also be provided with an unloading spout (not shown). In the preferred specific embodiment this hopper is constructed and adapted to receive corn grains from the bottom of the cylinder 43. A fine material hopper 81 is mounted around and along the lower portion of the cylinder 43. This hopper can be mounted in any suitable manner preferably by mounting brackets (not shown) from frame members 15 and 13. A discharge spout 83 is preferably mounted in a lower portion of the fine material hopper 81 to discharge fine materials therefrom.

In the preferred specific embodiment as hereinbefore described which is particularly adapted to separate corn from waste materials, the motor 55 is started which revolves drums 41 and 43 on rollers 35 and 39, and revolves the auger 21 in the tube 19. Corn containing waste products is unloaded into the loading hopper 31 and elevated by auger 21 through the tube 19 upwardly to the aperture 29. The perforations 47 in the inside drum are preferably sufficiently large to allow grains of corn together with other fine materials to pass therethrough during rotation of the cylinder 41 as the material falls downwardly from aperture 29 within cylinder 41. The coarse materials such as cobs, husks, large pieces of dirt and the like pass through the inside cylinder 41 and are discharged into the hopper 75. The perforations in the outside cylinder 43 are of a size so that grains of corn cannot pass therethrough and subsequently fall out of the lower end portion of the cylinder 43 into the product hopper 79. Fine materials such as dust, chaff, sand and the like fall through the perforations 49 of the outside cylinder 43 into the fine material hopper 81 and are discharged through spout 83.

In the preferred specific embodiment of my invention I have also provided means to regulate and adjust the rate of fall of materials as they pass through the cylinders 43 and 41. This adjustment is accomplished by the raising or lowering of the tube 19 and bosses 25 projecting therefrom into the slotted member 17 thereby increasing or decreasing the rate of fall of materials through the cylinders 41 and 43. Brackets 57 are preferably also adjustable so it will not be necessary to utilize different size belts 65 and 71 for different adjustments. This adjustment is important in that where the material to be separated is particularly full of waste materials, it has been found in practice to be advantageous to reduce the rate of fall of the materials through the cylinders 43 and 41. However, if the materials to be separated do not have a large amount of waste materials therein, greater speed of operation can be achieved by increasing the rate of fall through the cylinders 41 and 43.

The materials used in my invention are those used and commonly accepted for use in fabrication of machinery of this type, preferably iron and steel.

The foregoing discussion and description has been made in connection with preferred specific embodiments of the apparatus of separating granular materials of my invention. However, it is to be understood that the discussion and description is only intended to illustrate and teach those skilled in the art how to practice the invention, and such is not to unduly limit the scope of the invention, which is defined in the claims set forth hereinafter.

I claim:

1. An apparatus for separating various grades of granular materials comprising, a frame means, an inclined conveyor means mounted on said frame means, rotatable separating means mounted on said frame means and around an upper portion of said conveyor means for relative rotation thereto, said separating means having an outer perforated cylinder rotatably mounted on said conveyor means, said conveyor means having means for discharging material into an upper end of said separating means, powering means operably connectable to said conveyor and separating means, means for regulating the inclination of said conveyor means and separating means relative to said frame means thereby altering the duration of respective material separation in said separating means, said apparatus constructed and adapted to elevate material to be separated by said conveyor means, and separate said material by said separating means, and said conveyor means is a tube having an auger operably mounted therein, said discharge means having an aperture in an upper portion of said tube to discharge material therefrom into said separating means, said powering means is operably connected to the upwardly projecting end portion of said auger to rotate same; and a product hopper mounted on said frame means, adjacent, along and below said outer cylinder to collect a separated product therein.

2. The apparatus as defined in claim 1 wherein said frame means has a longitudinal member between a transverse axle and said conveyor means, a loading hopper operably mounted on the downward end portion of said tube and auger, and wherein said rotatable separating means has a perforated inner cylinder secured to said outer cylinder and rotatably mounted around an upper portion of said tube, and wherein said powering means is mounted on said conveyor means and operably connected to the upper outside portion of said outer cylinder to rotate same, and said powering means is operably connected to the upwardly projecting end portion of said auger to rotate same, and wherein said material collecting means has a trash hopper mounted on said frame means adjacent to the bottom end portion of said inner cylinder to collect coarse materials therefrom.

3. The apparatus as defined in claim 1 wherein said frame means has a transverse axle mounted thereon and a wheel mounted on each projecting end portion of said axle, a pair of spaced inwardly projecting longitudinal members mounted on said axle, the projecting end portions of said longitudinal members mounted on said conveyor means, two other longitudinal members mounted on said axle means adjacent said first-named longitudinal members and generally oppositely projecting from said axle means from said first-named longitudinal members, a slotted member projecting upwardly from each end portion of said last-named longitudinal members, said tube having a mounting flange downwardly projecting therefrom in a lower portion thereof, said first-named longitudinal members mounted on said mounting flange, the upper end portion of said tube projecting through and between said slotted members, a threaded boss mounted on each side of said tube, one of said bosses projecting through the slot in one of said slotted members and the other of said bosses projecting through the slot in the other of said slotted members, a screw auger operably mounted in said tube having a shaft portion projecting through the upper end portion of said tube, a pulley rigidly mounted on said projecting auger shaft portion, an aperture in the lower portion of an upper end portion of said tube to discharge material therefrom, a loading hopper operably mounted on the downward end portion of said tube, a spider rigidly mounted on an upward portion of said tube, said spider having a roller mounted on each projecting arm portion thereof, a second spider rigidly mounted on a central portion of said tube and having a roller mounted on each projecting arm portion thereof, and wherein said separating means has an inside perforated cylinder mounted around an upper portion of said tube, the rollers of said first spider engaging a circumferential race mounted on an inside end portion of the upper portion of said cylinder, said outer perforated cylinder rigidly mounted around said inside cylinder by a plurality of mounting arms operably connected between said cylinders, the lower portion of said inside cylinder having a circumferential race rigidly mounted thereon, said rollers of said second spider operably engaging said race, and wherein said powering means has an electric motor rigidly mounted by mounting brackets on the upwardly projecting end portion of said tube, said motor having a shaft projecting from each end thereof, a pulley rigidly mounted on each projecting end portion of said motor shaft, a V-belt race rigidly mounted on the upward end portion of said outer cylinder, a belt drivingly connected between one of said pulleys mounted on said motor and said V-belt on said outer cylinder, the other of said motor pulleys drivingly connected by belt means to said pulley mounted on said auger shaft to rotate same, and wherein said material collecting means has a trash hopper mounted on said frame means adjacent the lower portion of the downward portion of said inside cylinder to collect coarse materials therefrom, said trash hopper having a discharge spout mounted on the lower portion thereof, and a fine material hopper mounted on said frame means along and below the bottom portion of said outer cylinder to collect fine materials therefrom.

4. The apparatus as defined in claim 1 wherein said regulating means for adjusting the inclination of said conveyor means relatively to said frame means having an upright slotted member secured to said frame means extended adjacent said conveyor means, said conveyor means having a laterally extended boss member mounted within said slotted member, said boss member having a clamp member thereon operable to engage said slotted member at a desired vertical position relative thereto whereby said conveyor means is readily adjustable relative to said frame means to provide for the desired separation of the material therein.

References Cited

UNITED STATES PATENTS

| | | | |
|---|---|---|---|
| 1,007,119 | 10/1911 | Lee | 209—284 |
| 1,674,142 | 6/1928 | Strang | 209—296 |
| 1,843,404 | 2/1932 | Rasmussen | 209—421 X |
| 2,249,109 | 7/1941 | Botimer | 209—284 |
| 2,269,046 | 1/1942 | Whitehead et al. | 209—284 |
| 2,601,924 | 7/1952 | Gonder | 209—291 X |
| 2,706,046 | 4/1955 | Andrews | 209—420 X |
| 3,089,592 | 5/1963 | Gage | 209—291 X |
| 3,249,220 | 5/1966 | Bakke | 209—421 X |

FOREIGN PATENTS 23,429  7/1962  Germany.

HARRY B. THORNTON, *Primary Examiner.*

TIM R. MILES, *Assistant Examiner.*